May 5, 1936.  C. A. THOMAS  2,039,363
PREPARED RESIN
Original Filed June 17, 1930
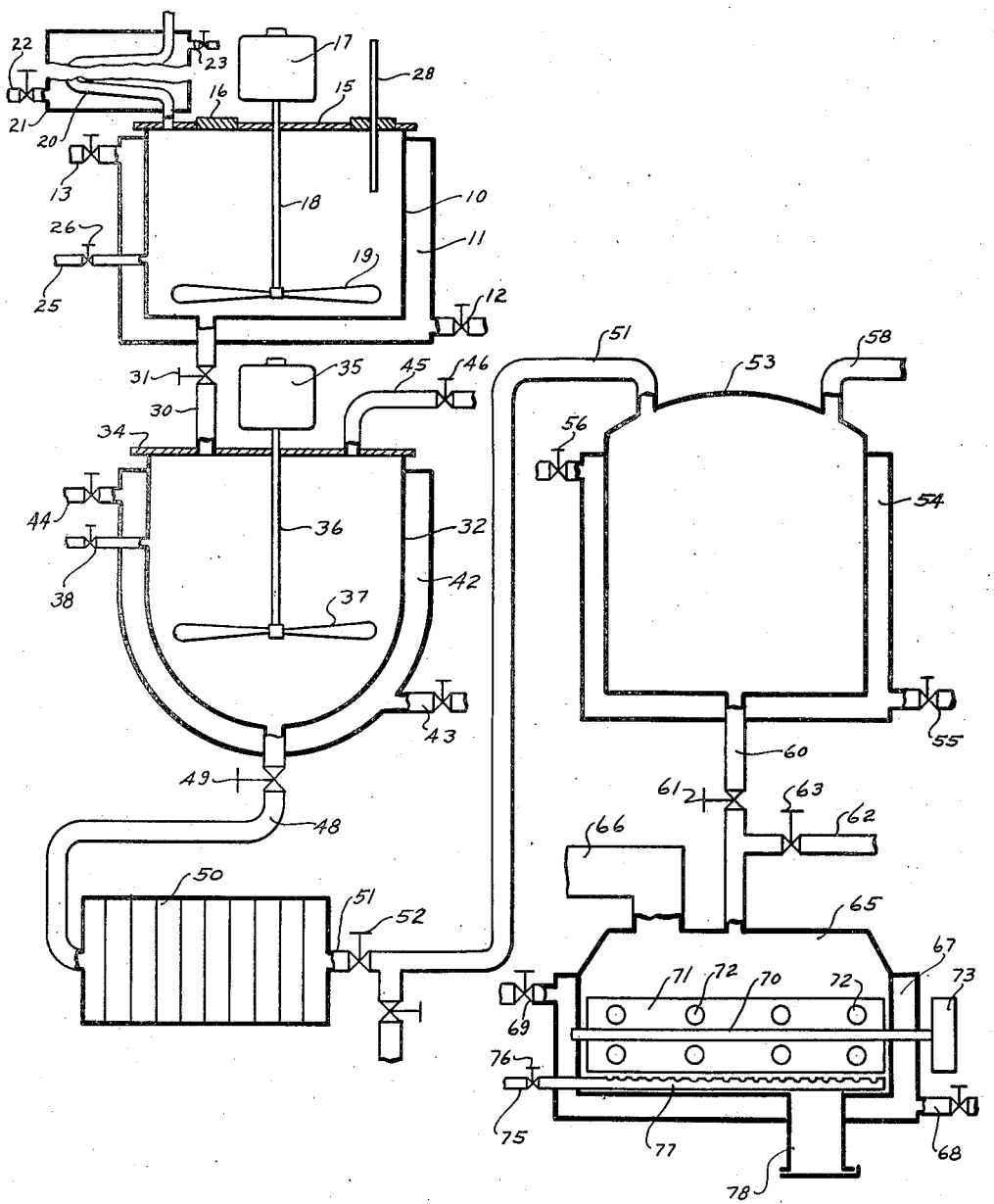
Inventor
Charles A. Thomas
By Maréchal and Noé
Attorney Patented May 5, 1936

2,039,363

UNITED STATES PATENT OFFICE 2,039,363

PREPARED RESIN

Charles A. Thomas, Dayton, Ohio, assignor, by mesne assignments, to Monsanto Petroleum Chemicals, Inc., Dayton, Ohio, a corporation of Delaware Application June 17, 1930, Serial No. 461,807
Renewed February 17, 1936

6 Claims. (Cl. 260—2)

This invention relates to the manufacture of artificial or prepared resins.

One of the principal objects of this invention is to provide such a prepared resin which has characteristics markedly superior in certain respects to the natural resins.

Another object of the invention is to provide a method of producing a prepared resin of controlled character, color and hardness.

Still another object of the invention is to provide apparatus for carrying out the above method and for producing the above product.

Other objects and advantages of the invention will be apparent from the following description when taken in connection with the accompanying drawing and appended claims.

The single view of the drawing is a diagrammatic representation of apparatus for practicing the method, and for producing the resin-like material of the present invention.

Reference is herein made to the copending application of Charles A. Thomas and Carroll A. Hochwalt, Serial No. 294,491, filed July 21, 1928 now Patent 1,836,629; and the application of Carroll A. Hockwalt, Serial No. 461,799, filed of even date herewith, which relate to production of synthetic resins of a similar character.

In the practicing of this invention, an unsaturated hydrocarbon having one double bond is reacted with an unsaturated hydrocarbon having more than one double bond in controlled proportions and under controlled conditions of polymerization, in the presence of a suitable catalyst or activating agent, such as anhydrous aluminum chloride. Thus very satisfactory results are secured by reacting a mixture of an olefine with a diolefine under such controlled conditions.

As examples of diolefine compounds which react with good results in this manner, there may be mentioned hexadiene ($CH_2=CH-CH_2-CH_2-CH=CH_2$), isoprene

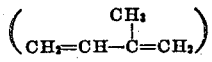

and butadiene ($CH_2=CH-CH=CH_2$), these being representative members of this group.

As examples of olefine compounds which react with the diolefine compounds, in the above manner, the amylenes may be mentioned as representative. These include symmetrical methyl ethyl ethylene ($CH_3-CH_2-CH=CH-CH_3$), unsymmetrical methyl ethyl ethylene

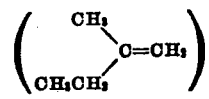

tri methyl ethylene

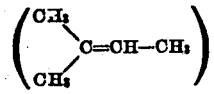

and normal propyl ethylene or pentene —2 ($CH_3-CH_2-CH_2-CH=CH_2$). Other unsaturated hydrocarbons having one double bond or olefines will react in this manner with diolefines. Thus ethylene ($CH_2=CH_2$) can be used by feeding in the compound as a gas into the reaction mixture. Likewise propylene ($CH_3CH=CH_2$) and octylene ($C_8H_{16}$) produce resins in this manner.

As an example of the carrying of this invention into effect, the following procedure is described for the reaction or polymerization of normal propyl ethylene with hexadiene. A mixture of these unsaturated hydrocarbons, in the proportion of about one to two mols of normal propyl ethylene to about one mol of hexadiene, is placed within a container or polymerizing vessel 10 which is in turn enclosed within a suitable jacket 11 having valve controlled inlet and outlet connections 12 and 13 for the supplying of water to jacket 11 for controlling the temperature of the mass within the container. A cover 15 is fastened in gas tight manner on the upper end of the vessel, and this cover is provided with a filling opening normally closed by a plug 16 through which material may be supplied to the interior. Cover 15 supports a motor 17, mounted in any suitable fashion, the shaft 18 of which projects downwardly into the vessel and carries a suitable stirrer or agitator 19 at its lower end. Leading off from the top of chamber 10 is a reflux condenser coil 20 positioned within a suitable cooling jacket 21 to which cooling liquid may be introduced through the valve controlled inlet 22 and discharged through the valve controlled outlet 23. The upper end of this condenser coil is open to atmosphere, as the purpose of it is to condense and return to the container 10 any vapors that may be generated during the reaction.

The unsaturated hydrocarbon compounds are fed into the container 10 through a pipe 25 controlled by valve 26 leading from a suitable source of supply. The activating compound, such as powdered anhydrous aluminum chloride ($Al_2Cl_6$) is added to the unsaturated hydrocarbons through the opening normally closed by plug 16. The aluminum chloride is preferably pulverized to give better contact. This material is also added in small quantities at a time while the contents of the container 10 are being agitated by the motor driven stirrer 19. For example, presuming that twenty-five gallons of a mixture of normal propyl ethylene and hexadiene are to be treated within container 10, aluminum chloride may be satisfactorily added in quantities of approximately six to eight ounces at a time. With the addition of the first batch of aluminum chloride, there is a rather active chemical reaction or condensation with a resultant rise in temperature. It is desirable to control the temperature of the reaction inasmuch as this has a bearing upon the character of the resultant resin, particularly the hardness thereof. The reaction is preferably carried out above 20° C., as then the resultant resin is very materially harder and the yield increases somewhat. However, it is desirable where an atmospheric polymerizing vessel is used that the temperature should not be permitted to rise much above 40° C. Otherwise the polymerizing vessel should be kept under pressure to prevent undue volatilization and loss of resin. Moreover, polymerization at higher temperatures, such as above 65° C., generally gives a resin of poorer color. Very satisfactory results are secured when the temperature is controlled between 25° and 35° C., this being readily accomplished by introducing the aluminum chloride in small amounts with proper agitation to prevent local overheating and by supplying cooling liquid to the cooling jacket 11. This polymerizing reaction is carried out in the absence of water.

Additional batches of aluminum chloride are added from time to time as may be done without unduly increasing the temperature within container 10, and this is repeated with continuous agitation until no further temperature rise results. The amount of aluminum chloride used is also controlled in accordance with the materials being treated, as this is found to have a bearing upon the yield. It is found that the larger the volume of active ingredients being treated at any one time, the lesser the amount of catalyst needed for optimum results. Thus when treating the above mixture in twenty-five gallon batches, very satisfactory results are secured by the addition of about three pounds of catalyst, this being equivalent to approximately 1.4 grams of catalyst for 100 c. c. of unsaturated hydrocarbons. Where smaller batches are being treated, such for example as a batch of 100 c. c., an increased proportion of catalyst is used to give maximum yield, generally about 3.5 to 3.7 grams of aluminum chloride per 100 c. c. of active ingredients giving optimum results. The quantity of catalyst needed for best results can be readily determined by tests for the particular ingredients and the particular volume of the ingredients being treated, so that this amount can be used in regular plant production. In any event, it is desirable that the amount of catalyst used be not increased materially over four grams per 100 c. c. of active ingredients, as the character of the resultant resin may be deleteriously influenced.

In addition to aluminum chloride, other compounds which hydrolyze in water giving an acid reaction will function satisfactorily to cause the conversion of the unsaturated hydrocarbons into resin,—for example chlorides of iron, boron, zinc, antimony, indium, titanium and tin; benzene sulfonic acid; propyl alcohol saturated with HCl gas; ethyl sulfate, and aniline hydrobromide. The time of the treatment is also found to have a bearing upon the resultant resin, particularly the color. The reaction may proceed as much as twelve hours, but it is found desirable to not leave the catalyst in contact with the material for a period of time much in excess of this, as the resin may be darkened. The reaction is preferably completed in less time, such as about four to six hours, this giving optimum results. A thermometer 28 may be mounted in the cover 15 to conveniently indicate the temperature of the reacting mass.

When the reaction within polymerizing vessel 10 is completed, the material is viscous and dark in color. This material is flowed from the polymerizing vessel through the outlet pipe 30 controlled by valve 31 into a neutralizing tank 32 containing a quantity of neutralizing agent. Tank 32 is provided with a tight fitting cover 34 which carries a motor 35 having a shaft 36 extending within the container and carrying at the lower end thereof suitable stirring blades 37. A valve controlled pipe 38 may be used to supply neutralizing liquid from a suitable reservoir (not shown). Various water soluble alkalies may be used for this neutralizing, but preferably ammonium hydroxide is employed as the excess of this material can subsequently be removed by distillation and it has no injurious effects upon the resulting resin.

The neutralizing treatment is also preferably carried out in the presence of a non-aqueous organic hydroxy compound which is effective to supply hydroxyl radicals for the decomposition and precipitation of the aluminum chloride or other activating agent present. An alcohol, such as ethyl alcohol, functions very satisfactorily for this purpose. Thus with the quantities specified above, about three gallons of a mixture of about 40% by volume of ammonium hydroxide containing 28% $NH_3$ and 60% by volume of 95% ethyl alcohol gives good results. The stirrer 37 is then started, and the polymerized reaction mass is introduced slowly from container 10 in a controlled stream by pipe 30 into the agitated neutralizing agent within tank 32. The neutralization in the presence of an organic hydroxy compound of this character with proper agitation gives a granular precipitate of aluminum hydroxide which is readily removed by filtration. The neutralization could be carried out in the presence of water but this renders subsequent distillation more difficult and is apt to result in quantities of water being occluded in the resin at this time. Other organic hydroxy liquids which are miscible with water, such as methyl alcohol, acetone, etc., may be used for this purpose. An alcohol or other organic hydroxy liquid saturated with gaseous $NH_3$ may be used for the neutralization with very satisfactory results.

The neutralization is accompanied by a color change of the reacting mass, the polymerized product changing from a black or dark red to a yellowish red color and thus indicating that the neutralization is completed and the mixture basic in character. The agitating and neutralizing action is generally completed in about half an hour. The ammonia neutralizes all of the aluminum chloride present, forming a flocculent precipitate of aluminum hydroxide. Some of the ammonium chloride formed in the reaction also precipitates in the organic solvents, and a portion of the resin reaction product may also precipitate. In order to insure that the resin is completely dissolved before filtration, an organic solvent which is immiscible in water, such as benzol, carbon tetrachloride, ethylene dichloride, and the like, is added to the neutralizing tank 32 prior to filtration. This organic solvent may be present during the neutralizing reaction and may be initially added to the tank 32 along with the ammonia and alcohol prior to the introduction of the polymerized reaction mass. Generally the addition of about three gallons of benzol is sufficient for this purpose.

When reacting an olefine with a diolefine in this manner, it is found that two products are formed, one being an amorphous resinous compound which is readily soluble in organic solvents such as benzol and being the resin that is desired, and another being a gelatinous compound which is insoluble in such solvents. This insoluble compound remains undissolved and is carried down in the precipitate. Tank 32 is provided with a temperature controlling jacket 42 having valve controlled inlet and outlet connections 43 and 44, respectively, by means of which a heating medium such as steam or hot water may be supplied to the heating jacket. After the neutralizing reaction is completed, the contents of tank 32 are preferably heated with steam by jacket 42 to a temperature of about 60° C. to insure that the produced resinous product is all dissolved. During this heating reaction, substantially all the excess ammonia is liberated and passes through the distillate offtake 45 having control valve 46.

The mass is then passed by discharge pipe 48 having control valve 49 to a suitable filter, such as a filter press 50, where the undissolved materials are removed from the liquid. The filtered sludge removed in filter press 50 is preferably treated to recover aluminum oxide ($Al_2O_3$) and ammonium chloride as by-products. The filtrate passes by pipe 51 having control valve 52 into a concentrating still 53 having an external heating jacket 54 provided with valve controlled inlet and outlet connections 55 and 56 respectively for the introduction of a suitable heating medium such as steam. Vessel 53 is provided with a tight fitting cover carrying a distillate offtake pipe 58 communicating with a suitable condenser (not shown). Steam is admitted to jacket 54 to distill off the more volatile constituents, including the benzol and alcohol, which pass off through the offtake 58 and are condensed and may be recovered for repeated use in the process. Distillation is continued until a thermometer in the distillation line rises to approximately 100° C. at which time substantially all of the alcohol and benzol, and any water, will have been driven off of the resulting resin, which is left in the vessel 53 as a semi-fluid or pasty mass.

If desired, the concentration of the resin may be controlled so as to leave a calculated amount of solvent in the resin so that it is maintained in solution form. This solution may then be withdrawn from the concentrating still 53 through pipe 60 having control valve 61, and through branch pipe 62 having control valve 63 to a place of storage. The resin in solution form in benzol, or other solvent such as solvent naphtha, may be used directly in the paint and varnish industries, or for other suitable uses without concentrating to dryness. If a solid resin is desired, the distillation is continued as described above until substantially all of the readily volatile solvents have been driven off, sufficient solvent or retained higher oils being left in the resin so that it is sufficiently fluid to flow through pipe 60 into an agitating and drying vessel 65.

This is preferably a closed vessel, having an offtake 66 leading to a suitable vent or stack, and a surrounding jacket 67 having valve controlled inlet and outlet connections 68 and 69 respectively for supplying a heating medium such as steam or hot oil thereto. Mounted within suitable bearings in the walls of vessel 65 is a horizontal shaft 70 carrying a plurality of radially extending flat blades or paddles 71, each blade being provided with a plurality of perforations or relatively large holes 72. The shaft 70 extends to the exterior of the vessel and carries a suitable pulley 73, or is otherwise connected to a line shaft or driving motor, so that the stirrer may be rotated at a relatively slow speed. A fluid is supplied to the container 65 by means of pipe 75 having control valve 76 communicating with a suitable perforated coil 77 mounted within the bottom of vessel 65 beneath the agitator 70. Preferably a non-aqueous non-oxidizing gaseous fluid, such as carbon dioxide, is thus introduced and passed through the resultant resinous mass while it is being agitated, so that intimate contact of the treated gas with the resin is secured. At the same time, a heating medium is introduced into jacket 67, and the temperature of the mass is raised to a controlled higher temperature.

It is found that where a non-oxidizing gas of this character is used and the mass is kept agitated, the heating jacket may be raised to a materially higher temperature with resultant rapid increase in the drying of the resin without injury to the resin. Thus heated oil at a temperature of about 180° C. may be supplied to this external jacket, and the drying operation completed in several hours. This treatment drives off any remaining solvent and higher oils present in the resin which tend to make it soft. By the use of a non-oxidizing fluid, a clear light colored neutral resin of good character is regularly obtained. Air may be used, if desired, for the drying operation; but generally it is found that where air or an oxidizing agent is used, the resulting resin is no longer neutral but has an acid number of about 1 to 60 dependent upon the degree of oxidation. By avoiding the use of steam or substantial quantities of water throughout the process, the occlusion of water in the resin is avoided and a clear product obtained. The resin is then removed from the drying vessel 65, as by the bottom outlet 78, and placed in suitable collecting troughs or shallow pans where it is allowed to cool or harden. While any suitable form of feed from one vessel to the other may be provided, a gravity feed throughout the entire system, such as disclosed herein, is preferred for commercial installations.

Any suitable source of supply of the unsaturated hydrocarbon mixture can be used. Thus the desired compounds may be obtained from cracked distillate. Certain fractions of cracked distillate may be treated directly and a resin obtained in the manner described above. However, it is found that such fractions of cracked distillate contain a large number of various hydrocarbon compounds, with the result that certain variables enter into the reaction or polymerization and different batches of distillate give resins of somewhat different characteristics. In accordance with the present invention the characteristics of the resin are effectively controlled and maintained by the employment of controlled ingredients or compounds. Thus by reacting a diolefine compound with an olefine compound in controlled proportions and under controlled conditions, a resin of a controlled and uniformly improved character is produced.

The proportions in which the olefine and diolefine compounds are used have an important bearing on the character of the resultant resin and upon the yield. Thus by way of example, commercial amylene (which generally is a mixture of the isomeric forms of amylene) was polymerized with isoprene, using one mol. of amylene to one mol. of isoprene. In such case, 65 grams of a good clear resin were obtained as against 26 grams of a gelatinous precipitate mentioned above. When isoprene was treated alone in the manner described, a negligible amount of resinous substance was obtained and a large amount of precipitate of little value was produced. When amylene was treated alone, a heavy viscous oil resulted, resembling lubricating oil. However, when mixtures of controlled proportions of this olefine and diolefine were used, then the reaction resulted in a yield of good clear resin. When the proportions of the ingredients were two mols of isoprene to one of amylene, about 25 grams of resin were obtained as against 67 grams of the precipitate. The yield of resin is thus materially smaller than where the compounds are used in the proportions of one mol. of each. Where two mols of amylene were mixed with one mol. of isoprene, then about 72 grams of resin were obtained to about 12 grams of precipitate. The resin, however, was softer, and not of as good character.

By properly proportioning the quantities of olefine and diolefine, a happy medium is struck between the yield of resin and the hardness or quality of the resin. Good results are obtained with the unsaturated hydrocarbon compounds mentioned above by the use of approximately three-fourths to two mols of amylene to one mol. of isoprene; optimum yield of a good grade of resin being secured with about one mol., or somewhat more than one mol., of amylene to one mol. of isoprene. The reaction of an olefine with a diolefine may thus be represented graphically as a curve, which appears to approach a straight line function, as indicated by the results outlined above. Thus when using 100% isoprene substantially no resin is obtained, but rather a gelatinous precipitate. As the proportion of amylene is progressively increased with reference to the isoprene used, the yield of resin is correspondingly increased, while the yield of precipitate is correspondingly reduced. This continues to be true, up to the point where the resin begins to be softer and of not as good character. When 100% amylene is used, an oil results. By progressively increasing the proportion of isoprene used with the amylene, the hardness of the product progressively increases although the yield progressively decreases, while the quantity of gelatinous precipitate obtained progressively increases. By following down the curve to a point where a resin of the proper hardness is obtained, then maximum yield of this grade of resin is secured with these proportions of the olefine and diolefine, while a minimum amount of the undesired precipitate results. The most suitable proportions for various unsaturated hydrocarbon mixtures can be readily determined by experiment in each individual case, and these proportions used in plant operation for optimum yield of the particular grade of resin desired.

It is to be understood that the term "unsaturated hydrocarbons" as used herein, refers to hydrocarbon compounds which unite with other compounds, such, for example, as the halogens, to form addition products without splitting off a new compound. Unsaturated hydrocarbons are capable of giving the Baeyer test for unsaturation. (Textbook of Organic Chemistry, Holleman, 6th ed. page 131.)

While the exact chemical reaction taking place is not definitely known, it appears that the reaction between the olefine, or hydrocarbon having an ethylene or methylene linkage and having one double bond, and the diolefine, or aliphatic diene having more than one double bond, is first a reaction of the former with the latter, whereby a cyclic diene having more than one double bond is produced. The molecules of the cyclic diene may then unite by polymerization to give unsaturated cyclic hydrocarbons of high molecular weight, thereby producing the resin of the present invention. This resin has been found to possess a molecular weight of about 900 to 1400, and has been found to be an unsaturated hydrocarbon believed to have the empirical formula

$$(C_nH_{2n-2})_x.$$

The resin so prepared in accordance with this invention is found to have a yellow shading to amber color, and is fairly clear. When dissolved in a suitable oil solvent such as naphtha, the resin forms a clear amber liquid, which when brushed onto a surface leaves a clear film which is practically colorless or has only a faint yellowish color. The prepared resin is non-acid in reaction and is unsaponifiable. Another very important and desirable characteristic of the prepared resin is that it does not retard the oxidizing action of linseed oil, so that a varnish can be prepared with this resin which compares favorably in speed of drying with lacquers.

While the method herein described and the apparatus for carrying out that method and the product so produced constitute preferred embodiments of my invention, it is to be understood that the invention is not limited to this precise method or apparatus, or precise product, and that changes may be made therein without departing from the scope of the invention which is defined in the appended claims.

What is claimed is:

1. As a composition of matter, a light amber to brown synthetic resin comprising the interreaction and polymerization product of a mixture consisting essentially of an olefine and a diolefine, such resin being substantially free from activating agent and containing less than approximately 0.01 per cent ash, the resin being substantially non-acid in reaction, substantially completely insoluble in acetone and substantially completely soluble in benzol.

2. As a composition of matter, a light amber to brown synthetic resin comprising the reaction product of a mixture comprising essentially amylene and isoprene in the presence of a metallic halide catalyst which hydrolyzes in water to give an acid reaction, such resin being substantially free from such catalyst and any decomposition products of the catalyst and containing less than approximately 0.01 per cent ash, the resin being a non-retarder of the drying of linseed oil, substantially completely insoluble in acetone, substantially completely soluble in benzol, and substantially non-acid in reaction.

3. As a composition of matter, a light amber to brown substantially neutral synthetic resin comprising the reaction product of substantially pure normal propyl ethylene with substantially pure hexadiene in the presence of a metallic halide catalyst which hydrolyzes in water to give an acid reaction, such resin being substantially free from such catalyst and decomposition products of such catalyst and containing less than approximately 0.01 per cent ash, the resin being a non-retarder of the drying of linseed oil, substantially completely insoluble in acetone and substantially completely soluble in benzol.

4. In the manufacture of polymerized hydrocarbon resin which is insoluble in acetone and alcohol but soluble in petroleum and aromatic spirits, the method which comprises polymerizing an anhydrous liquid hydrocarbon mixture containing as essential resin forming constituents an olefine and a diolefine in the presence of a metallic halide polymerizing catalyst that hydrolyzes to give an acid reaction, neutralizing the entire polymerized reaction mixture containing the resin product dissolved in the unreacted liquid hydrocarbon with an aqueous alkaline material whereby the catalyst is decomposed completely and the products of decomposition are rendered physically separable from the hydrocarbon resin solution, filtering the undissolved materials from the neutralized mass and recovering the resin from the hydrocarbon solvent by distilling the hydrocarbon solvent, said method being further characterized in that the temperature of the hydrocarbon mixture is maintained not substantially above 40° C. while the catalyst in undecomposed form is present therein.

5. In the manufacture of polymerized hydrocarbon resin which is insoluble in acetone and alcohol but soluble in petroleum and aromatic spirits, the method which comprises polymerizing an anhydrous liquid hydrocarbon mixture containing as essential resin forming constituents an olefine and a diolefine in the presence of a metallic halide polymerizing catalyst that hydrolyzes to give an acid reaction, the proportion of diolefine being in such excess of the proportion of olefine as to produce a resinous reaction product capable of forming a hard resin, neutralizing the entire polymerized reaction mixture containing the resin product dissolved in the unreacted liquid hydrocarbon with an aqueous alkaline material whereby the catalyst is decomposed completely and the products of decomposition are rendered physically separable from the hydrocarbon resin solution, filtering the undissolved materials from the neutralized mass and recovering the resin from the hydrocarbon solvent by distilling the hydrocarbon solvent, said method being further characterized in that the temperature of the hydrocarbon mixture is maintained not substantially above 40° C. while the catalyst in undecomposed form is present therein.

6. In the manufacture of polymerized hydrocarbon resin which is insoluble in acetone and alcohol but soluble in petroleum and aromatic spirits, the method which comprises polymerizing an anhydrous liquid hydrocarbon mixture containing as essential resin forming constituents an olefine and a diolefine, in the presence of a polymerizing catalyst consisting of anhydrous aluminum chloride that hydrolyzes to give an acid reaction, neutralizing the entire polymerized reaction mixture containing the resin product dissolved in the unreacted liquid hydrocarbon with an aqueous alkaline material whereby the catalyst is decomposed completely and the products of decomposition are rendered physically separable from the hydrocarbon resin solution, filtering the undissolved materials from the neutralized mass and recovering the resin from the hydrocarbon solvent by distilling the hydrocarbon solvent, said method being further characterized in that the temperature of the hydrocarbon mixture is maintained not substantially above 40° C. while the catalyst in undecomposed form is present therein.

CHARLES A. THOMAS.